No. 721,146. PATENTED FEB. 24, 1903.
J. BUTLER.
OUTER COVER FOR PNEUMATIC TIRES.
APPLICATION FILED OCT. 21, 1902.

NO MODEL. 2 SHEETS—SHEET 1.

WITNESSES.
Th. M. Kuehne
J. M. Dowling

INVENTOR.
Joseph Butler.
By his Attorneys Richardson

THE NORRIS PETERS CO., PHOTO-LITHO., WASHINGTON, D. C.

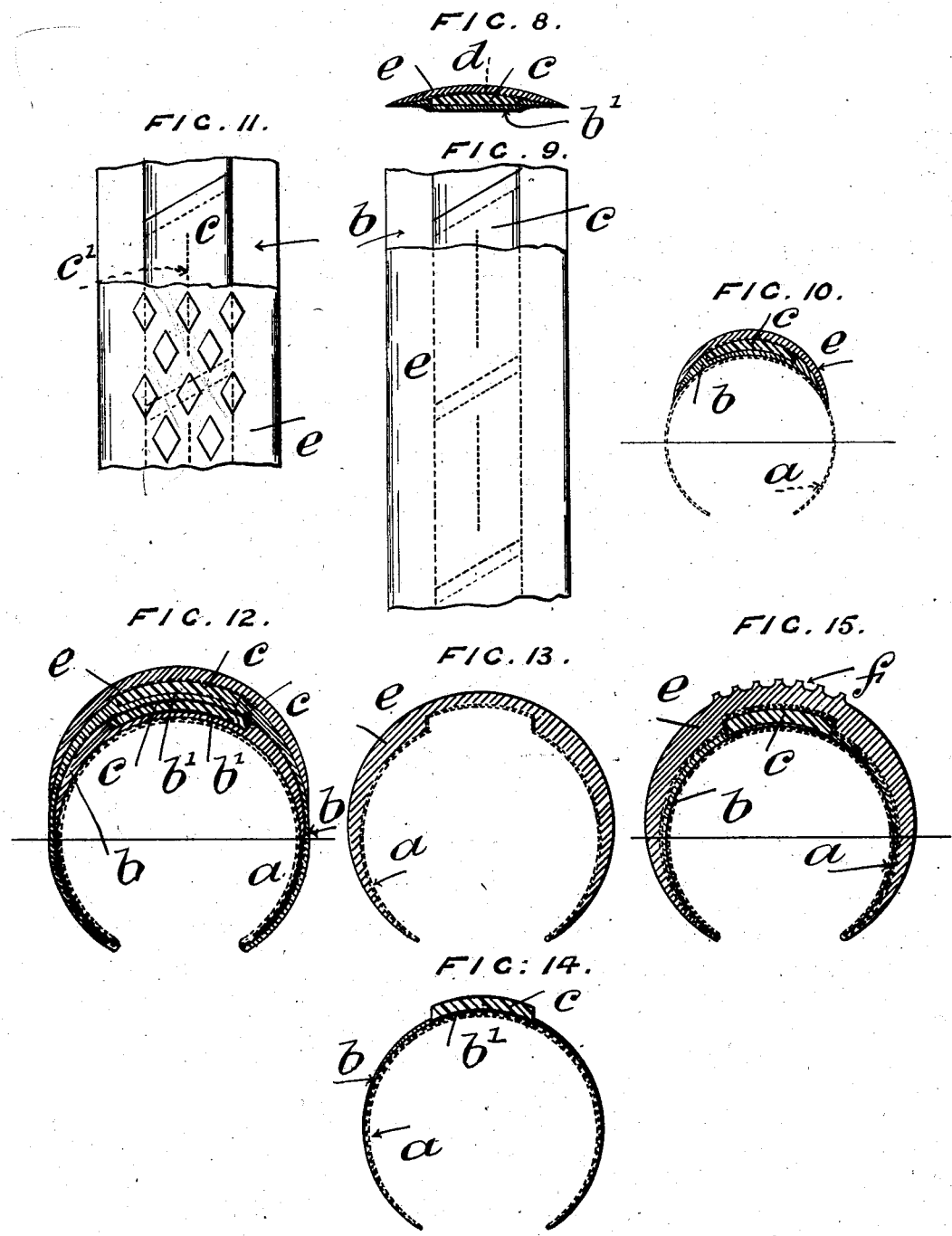

UNITED STATES PATENT OFFICE.

JOSEPH BUTLER, OF ALTRINCHAM, ENGLAND, ASSIGNOR OF TWO-THIRDS TO WILLIAM BELL, OF KNUTSFORD, ENGLAND, AND WILLIAM ANDREW JONES, OF MANCHESTER, ENGLAND.

OUTER COVER FOR PNEUMATIC TIRES.

SPECIFICATION forming part of Letters Patent No. 721,146, dated February 24, 1903.

Application filed October 21, 1902. Serial No. 128,098. (No model.)

*To all whom it may concern:*

Be it known that I, JOSEPH BUTLER, printer, a subject of the King of Great Britain and Ireland, residing at 105 George street, Altrincham, in the county of Chester, England, have invented certain new and useful Improvements in and Applicable to the Outer Covers of Pneumatic Tires, (for which I have made application in Great Britain, No. 7,798, and dated the 3d day of April, 1902,) of which the following is a specification.

My said invention has reference to improvements in and applicable to pneumatic tires, and relates particularly to the outer covers which surround and protect the air-tube. These outer protecting-covers are usually made up of a combination of canvas or woven material and rubber, the cover being generally thickened at the tread, as is well understood. In practice I find that the mere thickening of the tread or periphery of the tire does not adequately protect the inclosed air-tube, the thickened tread being frequently pierced by thorns, broken glass, or sharp-edged litter, so that a puncture of the air-tube results.

According to my invention I propose to incorporate within the thickness of the tread of the outer cover a continuous layer of puncture-resisting material made up of adjoining sections, such sections being preferably of a width about equal to the actual tread of the tire. The continuous puncture-resisting layer is surrounded by and buried within the material of the cover and is thereby entirely enveloped.

In order that my invention may be fully understood and carried into effect, I will throughout the following detailed description refer to the attached two sheets of drawings.

Figure 1:
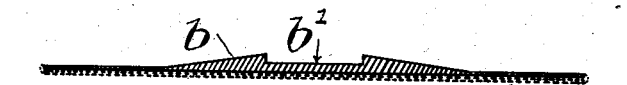
Figure 2:
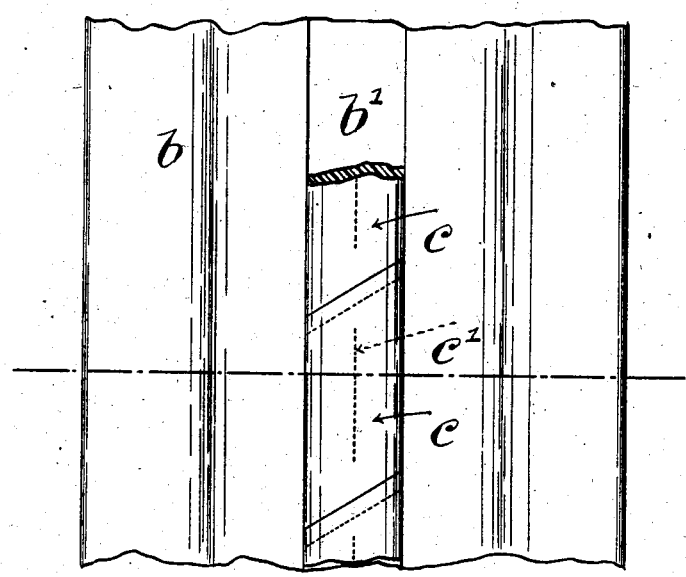
Figure 3:
Figure 4:
Figure 5:
Figure 6:
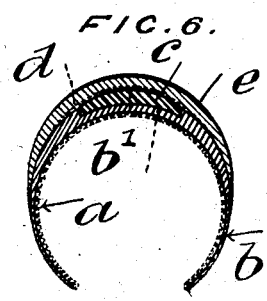
Figure 7:
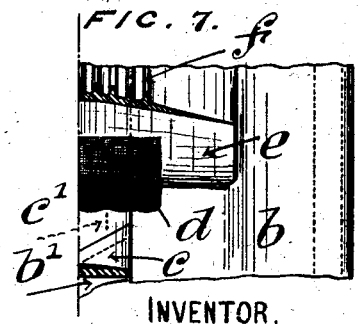

In the said drawings, on Sheet 1 Figure 1 is a sectional view of a rubbered fabric provided with a sunk tread and designed to form the foundation of my improved tire-cover. Fig. 2 is a plan view of a portion of this foundation and shows how the leather strips are applied within the sunk tread. Fig. 3 is a cross-section of Fig. 2 on the line X X. Fig. 4 shows a sectional view similar to Fig. 3, but with a waterproof covering applied, so as to prevent any possibility of water getting to the inclosed leather strips. Fig. 5 is a cross-sectional view and shows the outer coating or thickness of rubber, which completes the construction of the tire, duly applied. Fig. 6 is a cross-sectional view showing the arch or natural shape of the finished tire-cover. Fig. 7 is a half plan view of a portion of the tire seen in Fig. 5 with the outer rubber and waterproof covering turned back, so as to reveal the leather strips. On Sheet 2 Fig. 8 is a sectional view of a composite band comprising a sunk tread of rubber, leather strips, and an outer rubber covering capable of being applied either to a fabric foundation or to a rubbered foundation. Fig. 9 is a plan view of such band. Fig. 10 shows the band applied to a simple fabric foundation. Fig. 11 is a plan view similar to Fig. 9, but the outer rubber covering is provided with diamond-shape projections to minimize the risk of side slip. Fig. 12 shows a modified form of complete tire of considerable strength in which two layers of leather strips disposed in the tread of the cover are utilized. Figs. 13, 14, and 15 indicate a modified way of introducing the strips of leather within the tread of the tire-cover.

In carrying my invention into practical effect and in producing the tire-cover illustrated in Sheet 1 I employ the usual or any suitable canvas or fabric foundation $a$, which is duly served with rubber, so as to produce the coating $b$. This rubber coating $b$ is so molded or fashioned as to present a sunk tread or annular depression $b'$, as clearly shown in Fig. 1, the depression about corresponding in width with the actual tread of the tire. Within this sunk tread or annular depression $b'$ and upon the rubbered foundation I superpose strips of leather $c$, which are arranged at an angle and one against another, so as to produce a sectional band or layer of leather which encircles the whole of the partially-formed tire. These strips of leather $c$ are firmly solutioned in position. Each of the leather strips $c$ is of a convenient length and of a width corresponding with the width of the sunk tread $b'$, the ends of adjoining strips being beveled and overlapping at an angle, as is most clearly shown in Fig.

2. This angular arrangement of the strips $c$ prevents any tendency of the leather strips to creep while the tire is at work. In order to further minimize any risk of creeping or possible displacement of the strips $c$, each strip is securely stitched to the tire foundation $a\,b$ by lines of stitching $c'$. When the adjoining sections $c$ are all secured in position, a circumferential protecting layer made up of individual strips of leather each free to yield practically independent of the other is produced.

Instead of forming the adjoining strips $c$ of leather, hide, gut, or the like, or specially hard-woven or prepared material, or other suitable substance may be employed for the purpose, as thought desirable.

To protect the circumferential layer of leather or other strips $c$ from the adverse influence of water and from contact with the final rubber jacket, a layer or layers of waterproof fabric or material is disposed around the partially-completed tire, so as to wholly inclose the leather or other strips. This waterproof fabric or material shutting in the leather strips $c$ is clearly indicated in Fig. 4 and is marked $d$. Finally, the outer face of the tire-cover is next provided with the exterior rubber jacket or surface $e$, the application of which when vulcanization has been effected completes the formation of the tire. If desired, the final jacket or surface $e$ may extend across the whole width of the tire or from the point $e'$ to the point $e'$, as indicated in Fig. 5.

In Fig. 6 the completed tire-cover is shown in cross-section, the figure clearly indicating the arch of the tire.

From the foregoing description it will be understood that the puncture-resisting layer made up of individual strips is buried away in the body of the cover and is effectually shielded from actual wear and the adverse influence of moisture.

The outer rubber face of the cover may be provided with non-slipping projections and recesses of any convenient shape. For instance, in Fig. 7 circumferential flutes $f$ are shown.

By the use of a buried sectional layer of puncture-resisting material, as herein described, I effectually protect the tread of the cover, which is the really vulnerable part of the tire and this without materially affecting the resiliency and weight of the said tire.

I find from actual experience that an articulated or sectional layer of the indicated kind does not as a matter of fact affect the resiliency of the tire at all and that owing to the presence of both a resilient facing and backing for the interposed strips the tire is practically impenetrable.

Figs. 8, 9, 10, and 11, Sheet 2, illustrate the application of my invention to a racing-tire or a tire not having a rubber exterior. In such a case the leather strips $c$ are arranged upon and secured to a sunk tread $b'$ in a manner similar to that hereinbefore described, and the waterproof covering $d$ and final rubber jacket $e$ are also applied so as to produce the band clearly shown in the sectional view Fig. 8 and in the view Fig. 9. This completed band is then solutioned to the special canvas or woven foundation $a$, as indicated in Fig. 10, and the finished tire results. Fig. 11 shows a band similar to that indicated in Figs. 9, 10, and 11; but the outer jacket $d$ is formed with diamond-shaped projections as a safeguard against side slip.

A band comprising a sunk tread, leather strips, waterproof covering, and final rubber jacket might be applied to an ordinary tire in which the tread has become worn and so as to prolong the life of such a tire. If $a$ be taken as the worn tire, Fig. 10 clearly indicates such an application of my invention.

It will be obvious that instead of using a single interposed sectional layer of puncture-resisting material two or more layers may be used, and in this case the angles of adjoining strips in the succeeding layers may vary or the joints in each layer may not coincide. The Fig. 12 clearly indicates such a duplex layer of puncture-resisting material applied in accordance with my invention.

Instead of the layer of leather or other strips $c$ being applied from the front of the tire the strips may be secured upon a canvas or rubber foundation having a sunk tread $b'$, as shown in Fig. 14, such foundation and layer being then thrust into the interior of the tire-half shown in Fig. 13. When the two halves are secured together, the layer $c$ occupies an annular recess or channel formed around the interior of the half Fig. 13. By securing the halves firmly together the tire shown in Fig. 15 results. The sections of tire-cover indicated in Figs. 12 and 15 are particularly suitable for the wheels of motor-vehicles, while those indicated in the earlier figures are more adapted for use on cycle or other light-vehicle wheels.

The manner of securing covers made substantially as herein described is not material to the present invention.

I declare that what I claim is—

1. An outer protecting-cover for the air-tubes of pneumatic tires comprising a canvas or fabric foundation, a rubber serving secured thereto, said rubber serving being formed with a sunk tread $b'$, individual and independent leather strips separately secured in said sunk tread, said individual leather strips abutting angularly end to end, said sectional layer of strips extending around circumferences of the cover within said sunk tread and an outer jacket or serving of rubber shrouding said embedded layer of leather strips, substantially as described.

2. An outer protecting-cover for the air-tubes of pneumatic tires, comprising a canvas or fibrous foundation $a$, and a serving of rubber $b$, a sunk tread $b'$ formed in said serving, continuous layer of individual strips $c$ unconnected one to another and having angular meeting ends, said strips being stitched or secured separately within the sunk tread, waterproof cloth $d$ protecting the layer of leather strips, and a final jacket or outer serving of rubber $e$, substantially as described.

3. A protecting-band for application to the outer covers of pneumatic tires, comprising a rubber or other foundation $b$ formed with a sunk tread $b'$, continuous layer of individual strips $c$ unconnected and having angular and beveled meeting ends, said strips being stitched or secured separately within the sunk tread, waterproof cloth $d$ protecting the layer of leather strips, and a final jacket or outer serving of rubber $e$, substantially as described.

4. An outer protecting-cover for pneumatic tires, comprising a fabric or composite foundation, a sunk tread formed in said foundation for abutting but not connected strips of leather forming a layer around said foundation, and a further rubber serving having a sunk tread and an additional leather layer made up of separate and unconnected strips, the abutting ends of which meet at an angle, and an outer serving of rubber $e$, all substantially as described.

5. An outer protecting-cover for pneumatic tires, comprising a canvas foundation having a rubber serving secured thereto and formed with a sunk tread $b'$ in which unconnected strips of leather having angular abutting edges are secured, said connected elements fitting the interior of an exterior half or jacket $e$ comprising a canvas foundation and a rubber serving formed with an internal annular recess the two halves of the tire when combined and connected by solution or stitching forming the cover, substantially as described.

In witness whereof I have hereunto set my hand in presence of two witnesses.

JOSEPH BUTLER.

Witnesses:
 JAMES BATE,
 ALFRED YATES.